United States Patent
Izawa et al.

(10) Patent No.: US 10,915,181 B2
(45) Date of Patent: Feb. 9, 2021

(54) PUSH BUTTON SWITCH WITH OPERATION UNIT LATCHED TO BASE

(71) Applicant: OMRON Corporation, Kyoto (JP)

(72) Inventors: Kazuhira Izawa, Okayama (JP); Hiroaki Fujino, Okayama (JP); Mamiko Naka, Okayama (JP); Kenshi Nagata, Okayama (JP)

(73) Assignee: Omron Corporation, Kyoto (JP)

( * ) Notice: Subject to any disclaimer, the term of this patent is extended or adjusted under 35 U.S.C. 154(b) by 189 days.

(21) Appl. No.: 16/301,367

(22) PCT Filed: Mar. 15, 2017

(86) PCT No.: PCT/JP2017/010452
§ 371 (c)(1),
(2) Date: Nov. 13, 2018

(87) PCT Pub. No.: WO2017/208566
PCT Pub. Date: Dec. 7, 2017

(65) Prior Publication Data
US 2020/0326788 A1  Oct. 15, 2020

(30) Foreign Application Priority Data
Jun. 2, 2016  (JP) .............................. 2016-111338

(51) Int. Cl.
*H01H 9/20* (2006.01)
*H01H 3/12* (2006.01)
(Continued)

(52) U.S. Cl.
CPC .............. *G06F 3/02* (2013.01); *H01H 3/125* (2013.01); *H01H 9/20* (2013.01); *H01H 9/22* (2013.01);
(Continued)

(58) Field of Classification Search
CPC  H01H 3/12; H01H 3/125; H01H 9/02; H01H 9/08; H01H 9/20; H01H 9/22
See application file for complete search history.

(56) References Cited

U.S. PATENT DOCUMENTS

| 8,624,140 B2 * | 1/2014 | Nishino | H01H 13/702 |
| | | | 200/302.2 |
| 9,640,338 B2 * | 5/2017 | Abe | H01H 3/122 |
| 2008/0006516 A1 | 1/2008 | Nishino et al. | |

FOREIGN PATENT DOCUMENTS

| CN | 105321754 A | 2/2016 |
| JP | 2008-021423 A | 1/2008 |
| JP | 2008-287967 A | 11/2008 |

OTHER PUBLICATIONS

International Search Report issued in PCT/JP2017/010452, dated Jun. 20, 2017 (1 page).

(Continued)

*Primary Examiner* — Vanessa Girardi
(74) *Attorney, Agent, or Firm* — Osha Bergman Watanabe & Burton LLP

(57) ABSTRACT

A switch has a base, an operation unit disposed on the base and moving in a contacting-separating direction with respect to the base in response to an external force, and a link member configured to guide movement of the operation unit in the contacting-separating direction and support the operation unit on the base. The base includes a base-side latching portion. The operation unit includes an operation-unit-side latching portion configured to be latched to base-side latching portion at an end of an allowable movement range for the operation unit in a separating direction in which the operation unit is separated from the base. The base-side latching portion and the operation-unit-side latching portion are latched to each other to inhibit the operation unit from (Continued)

moving in the separating direction beyond the separating-direction end of the allowable movement range.

7 Claims, 8 Drawing Sheets

(51) Int. Cl.
*H01H 9/22* (2006.01)
*G06F 3/02* (2006.01)
*H01H 13/14* (2006.01)
*H01H 13/7065* (2006.01)

(52) U.S. Cl.
CPC ........ *H01H 13/14* (2013.01); *H01H 13/7065* (2013.01)

(56) References Cited

OTHER PUBLICATIONS

Written Opinion issued in PCT/JP2017/010452, dated Jun. 20, 2017 (4 pages).
Office Action issued in Chinese Application No. 201780028541.7, dated Apr. 29, 2019 (14 pages).

\* cited by examiner

--Prior Art--

--Prior Art--

PUSH BUTTON SWITCH WITH OPERATION UNIT LATCHED TO BASE

BACKGROUND

Technical Field

The present invention relates to a switch and a keyboard, the switch including a pair of link members that smoothly moves an operation unit in parallel in a contacting/separating direction even when a corner part of the operation unit is pressed.

Related Art

As a mechanism for smoothly moving an operation unit up and down in parallel even when a corner part of the operation unit is pressed while achieving a low profile, for example, a key switch device disclosed in Patent Document 1 using a link member is hitherto known.

As illustrated in FIG. 7, a key switch device 100 disclosed in Patent Document 1 is provided with: a base portion 101; a key top 105 disposed above the base portion 101; a pair of link members 102 interlock with each other configured to guide and support the key top 105 in an upward/downward direction (i.e., in a practically perpendicular direction) with respect to the base portion 101; a switch member 103 including a contact portion of an electric circuit which opens and closes in response to upward/downward movement of the key top 105; and an urging member 104 configured to apply an upward elastic urging force (i.e., an initial position restoring force) to the key top 105. In the key switch device 100, the pair of link members 102 interlocks with each other, so that the key top 105 can make upward/downward movement in the perpendicular direction with respect to the base portion 101 while maintaining a predetermined posture.

As described above, the key switch device 100 has a structure including the pair of link members 102 so as to press the key top 105 in parallel. As illustrated in FIG. 8 which is a modified example of FIG. 7, the link member 102 is fixed to a link support member 110 (corresponding to 106 in FIG. 7) attached to the key top 105. In the link support member 110, two bearing holes 111 are formed in opposed walls 112 with respect to one link member 102, and a rotary spindle 102a of the link member 102 is inserted into the bearing holes 111. Thus, even when a force for separating the key top 105 from the link member 102 is applied, it is possible to maintain the coupling between the key top 105 and the link support member 110 and to prevent damage on the bearing hole 111.

Patent Document 1: Japanese Unexamined Patent Publication No. 2008-21423 (published on Jan. 31, 2008)

SUMMARY OF THE INVENTION

However, in the conventional key switch device 100 disclosed in Patent Document 1 above, the link support member 110 is coupled only to the link member 102. For this reason, when a force for separating the key top 105 from the link support member 110 is applied to the key top 105, all the force acts on the bearing hole 111 in the link support member 110, and as a result, the bearing hole 111 in the link support member 110 or the link member 102 is deformed to ultimately separate the link support member 110 from the link member 102.

One or more embodiments of the present invention is to improve resistance of an operation unit to an external force and provide a switch and a keyboard with higher reliability.

A switch of one aspect of the present invention includes:
a base;
an operation unit disposed on the base and moving in a contacting/separating direction with respect to the base in response to an external force; and
a link member configured to guide movement of the operation unit in the contacting/separating direction and support the operation unit on the base,
wherein
the base includes a base-side latching portion,
the operation unit includes an operation-unit-side latching portion configured to be latched to the base-side latching portion at an end of an allowable movement range for the operation unit in a separating direction in which the operation unit is separated from the base, and
the base-side latching portion and the operation-unit-side latching portion are latched to each other to inhibit the operation unit from moving in the separating direction beyond the separating-direction end of the allowable movement range.

Further, a keyboard of one aspect of the present invention includes a plurality of the switches of the above aspect.

According to the switch of one aspect of the present invention, there is exerted an effect to improve resistance of the operation unit to an external force and provide a switch and a keyboard with higher reliability.

According to the keyboard of one aspect of the present invention, it is possible to improve resistance of the operation unit to an external force and provide a keyboard including a switch with higher reliability.

DETAILED DESCRIPTION

Embodiments of the present invention will be described as follows with reference to FIGS. 1(a) to 6. In the following description, terms indicating specific directions or positions (e.g., terms including "upper", "lower", "right", and "left") are used as necessary. However, these terms are used to facilitate understanding of the invention with reference to the drawings, and the meanings of the terms do not limit the technical scope of the present invention. The following description is merely exemplary in nature and not intended to limit the present invention, its application, or its usage. Further, the drawings are schematic, and ratios of dimensions or the like do not necessarily agree with actual ones. A switch according to the embodiment includes a pair of link members that smoothly moves an operation unit up and down (in a contacting/separating direction in which the operation unit comes into contact with or separates from the base) in parallel even when a corner part of the operation unit is pressed. The switch is suitably used in a keyboard of a personal computer or the like, for example, by detachably attaching a key top onto the operation unit. In some cases, the operation unit is used as it is as a key top. In each of sectional views illustrated in FIGS. 1(a), 4(a), 4(b), 5, and 6, a resin hatching portion means resin insulating hatching. Light black given to a first link member 21 and a second link member 22 is for making the first link member 21 and the second link member 22 easier to understand, and is not hatching.

(Configuration of Switch)

Figure 2A:
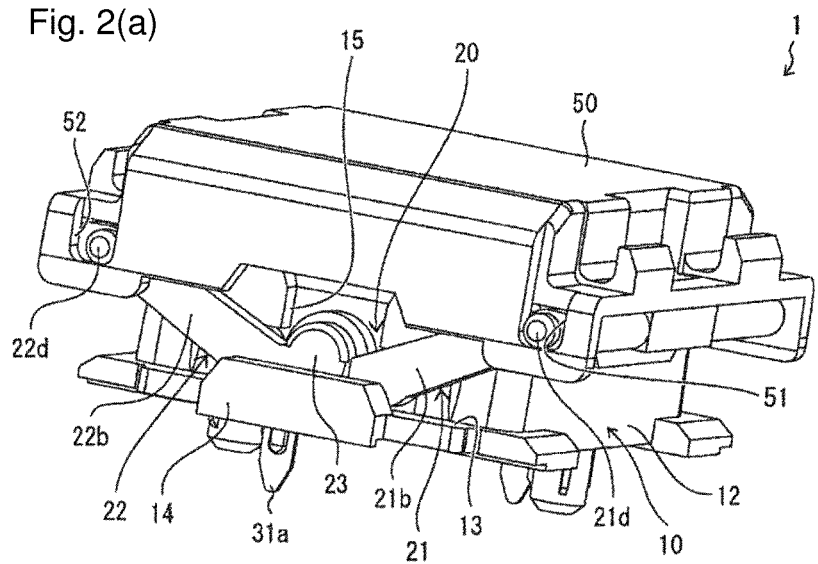
FIG. 2(a) is a perspective view illustrating a state of the switch when the operation unit is not depressed.
Figure 2B:
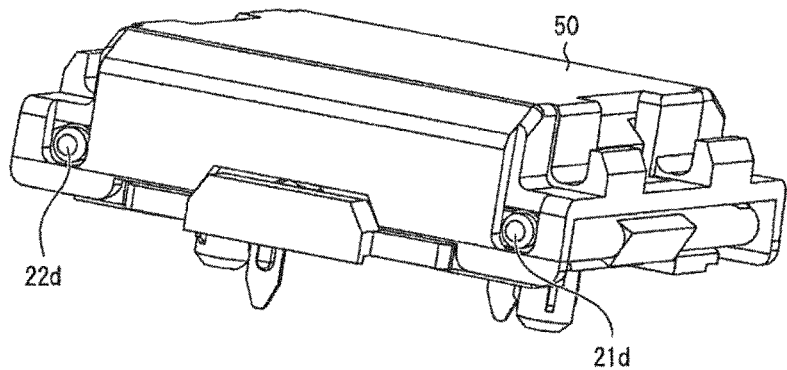
FIG. 2(b) is a perspective view illustrating a state of the switch when the operation unit is depressed.
Figure 3:
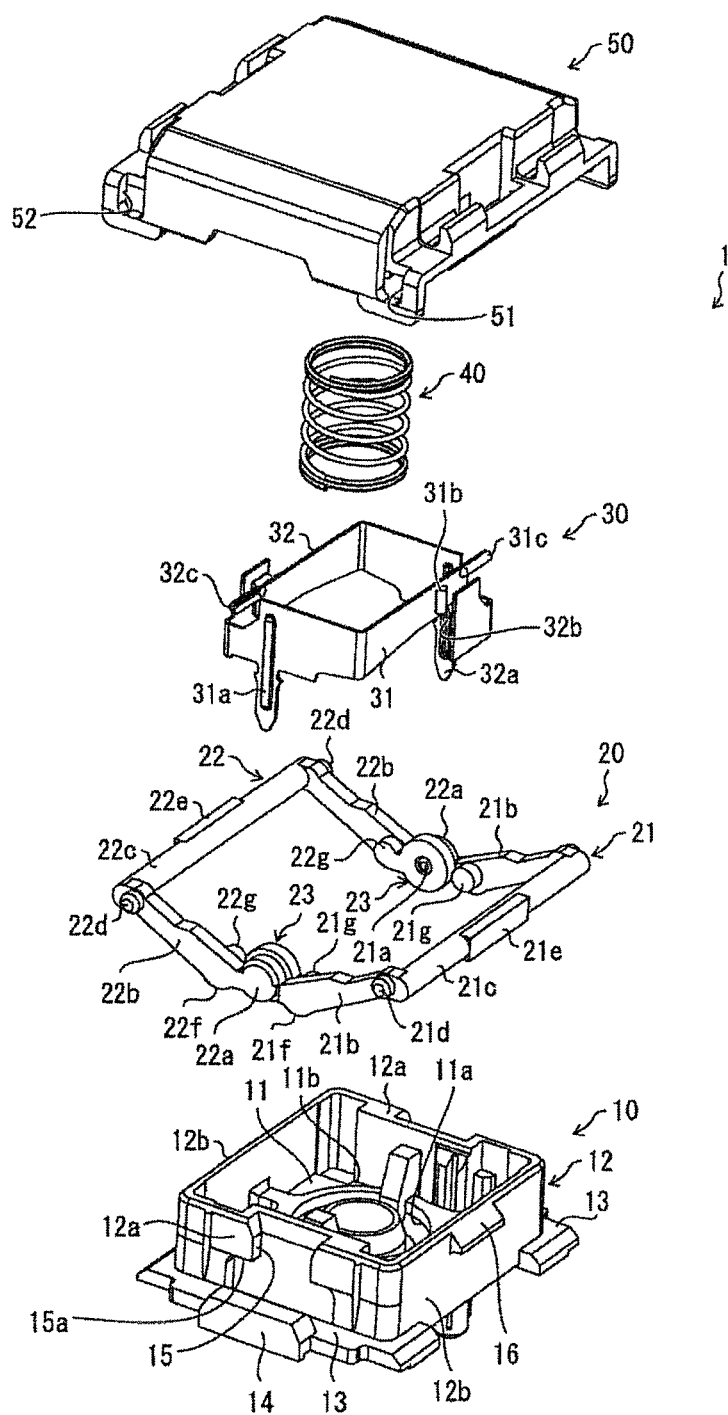
FIG. 3 is an exploded perspective view illustrating a configuration of the switch.

The configuration of the switch according to the embodiment will be described with reference to FIGS. 2(a), 2(b) and FIG. 3. FIG. 2(a) is a perspective view illustrating the configuration in a state where an operation unit 50 in the switch of the embodiment has not been depressed, and FIG. 2(b) is a perspective view illustrating the configuration in a state where the operation unit 50 in the switch 1 has been pressed. FIG. 3 is an exploded perspective view illustrating the configuration of the switch of the embodiment.

As illustrated in FIGS. 2(a) and 2(b), the switch 1 of the embodiment includes a base 10 and the operation unit 50 as an operation unit disposed above the base 10. As illustrated in FIG. 3, between the base 10 and the operation unit 50, there are provided a pair of link members 20 that interlock with each other to guide and support the operation unit 50 on the base 10 in an upward/downward (contacting/separating) direction, a switch mechanism 30 that opens and closes contacts of an electric circuit in response to upward/downward operation (contacting/separating operation) of the operation unit 50, and a coil spring 40.

The base 10 is made up of a square frame 12 having a bottom 11, and a guard portion 13 is formed outside a pair of one opposed side walls 12a in the square frame 12. This guard portion 13 is used to support the link member 20. Further, in the embodiment, the outer surface of the guard portion 13 is provided with an extrusion preventing wall 14 as a deformation preventing portion for preventing lateral extrusion of the elastic link member 20.

As illustrated in FIG. 3, in a center portion of the one opposed side wall 12a, a side wall recessed groove portion 15 is formed as a gap which is recessed inward. This side wall recessed groove portion 15 has a width such that a coupling portion 23 of the link member 20 and the closed first link member 21 and second link member 22 can freely move up and down. As a result, with the first link member 21 and the second link member 22 in an open state, the coupling portion 23 or a first curved projection 21g and a second curved projection 22g of a first arm 21b and a second arm 22b, described later, cannot pass through the side wall recessed groove portion 15. In addition, an overhanging portion (protrusion) 15a is formed in the side wall recessed groove portion 15. With the first link member 21 and the second link member 22 in the open state, the overhanging portion 15a is brought into contact with the first curved projection 21g and the second curved projection 22g of the first arm 21b and the second arm 22b and slides, so as to have a function as a wall surface to regulate upward movement of the first arm 21b and the second arm 22b.

A claw portion 16 (an example of a base-side latching portion (a latching projection)) is formed at the center of the upper portion outside each of a pair of the other opposed side walls 12b (an example of a first side wall portion) in the square frame 12. That is, the pair of the other opposed side walls 12b is disposed near the outer edge of the base 10, extends in the contacting/separating direction toward the operation unit 50, and is provided with base-side latching portions. The claw portion 16 is for preventing the operation unit 50 from being easily detached upward. Note that the claw portion 16 will be described in detail later.

The bottom 11 is formed with an annular groove-like coil spring accommodating portion 11a that supports and accommodates the coil spring 40, and a terminal through hole 11b that allows passage of a terminal of the switch mechanism 30.

Next, the link member 20 is made up of a pair of the first link members 21 and the second link members 22, to support the base 10 and the operation unit 50 so that the operation unit 50 moves in a vertical direction (contacting/separating direction). Although the link member 20 of the embodiment is made up of a pair of the first link members 21 and the second link members 22, the present invention is not necessarily limited thereto. For example, the link member 20 is not limited to being a pair and may be provided only on one side (cantilevered).

The first link member 21 and the second link member 22 have the same shape and are coupled to each other by a coupling portion 23 mutually coupled at one end on the center side and combined in a V shape in a side view. In the embodiment, the coupling portion 23 is made up of a shaft portion 21a formed in the first link member 21 and a shaft hole portion 22a formed in the second link member 22, and pivotally supports and couples between the pair of link members 20 in a turnable manner. Note that a shaft portion may be formed in the second link member 22 and a shaft hole portion may be formed in the first link member 21.

The shaft portion 21a and the shaft hole portion 22a are pivotally supported and coupled in a turnable manner in a loosely fitted state, and a gap is constant in this loosely fitted portion.

Figure 5:
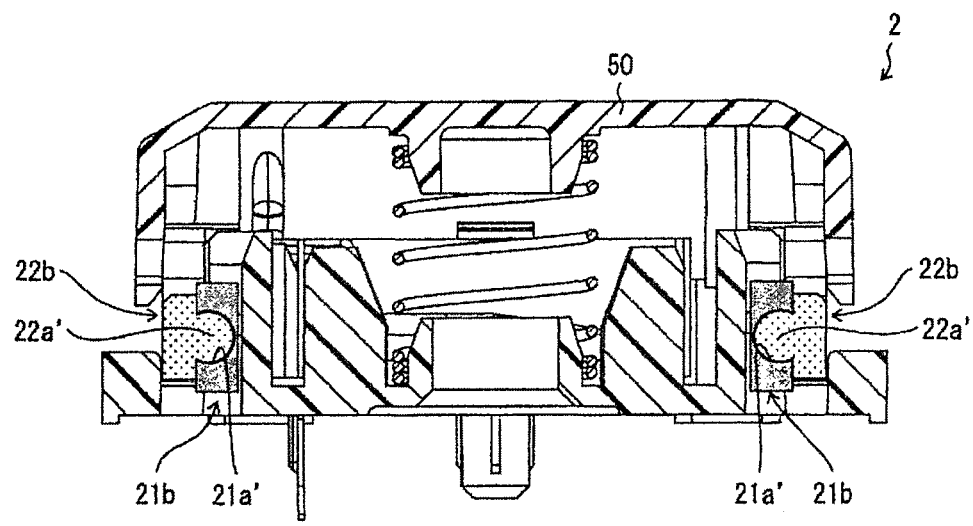
FIG. 5 is a sectional view illustrating a configuration of a modified example of the switch.

In the switch 1 of the embodiment, the coupling portion 23 is made up of the shaft portion formed in one of the first link member 21 and the second link member 22, and the shaft hole portion formed in the other of the first link member 21 and the second link member 22, but the shaft portion and the shaft hole portion are not necessarily restrictive. For example, as illustrated in FIG. 5, there may be provided a switch 2 made up of a sphere portion 22a' formed in one of the first link member 21 and the second link member 22, and a sphere acceptor 21a' that rotatably holds this spherical portion 22a'.

The first link member 21 and the second link member 22 integrally include the first arm 21b and the second arm 22b as a pair of connection members extending laterally in parallel to each other from the coupling portion 23, and a first latching rod 21c and a second latching rod 22c which couple between the first arm 21b and the second arm 22b at the ends on the opposite side from the coupling portion 23.

Figure 6:
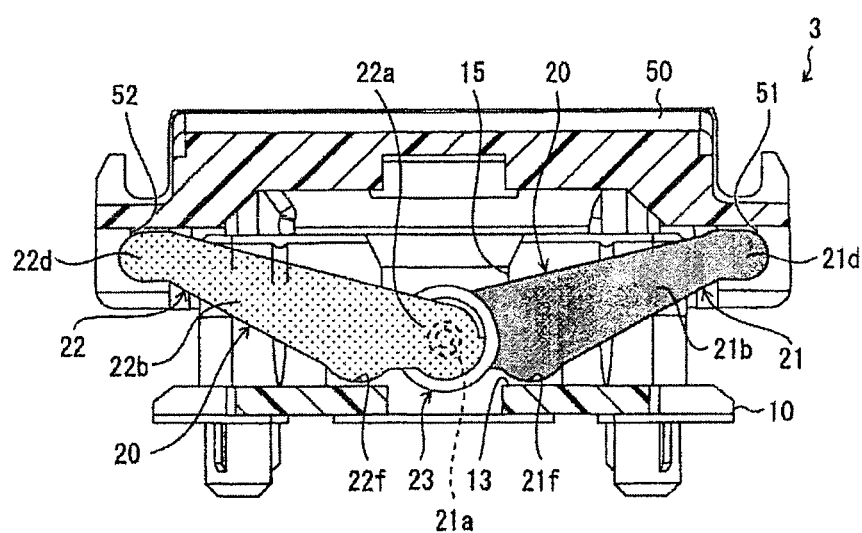
FIG. 6 is a sectional view illustrating a configuration of another modified example of the switch.
Figure 7:
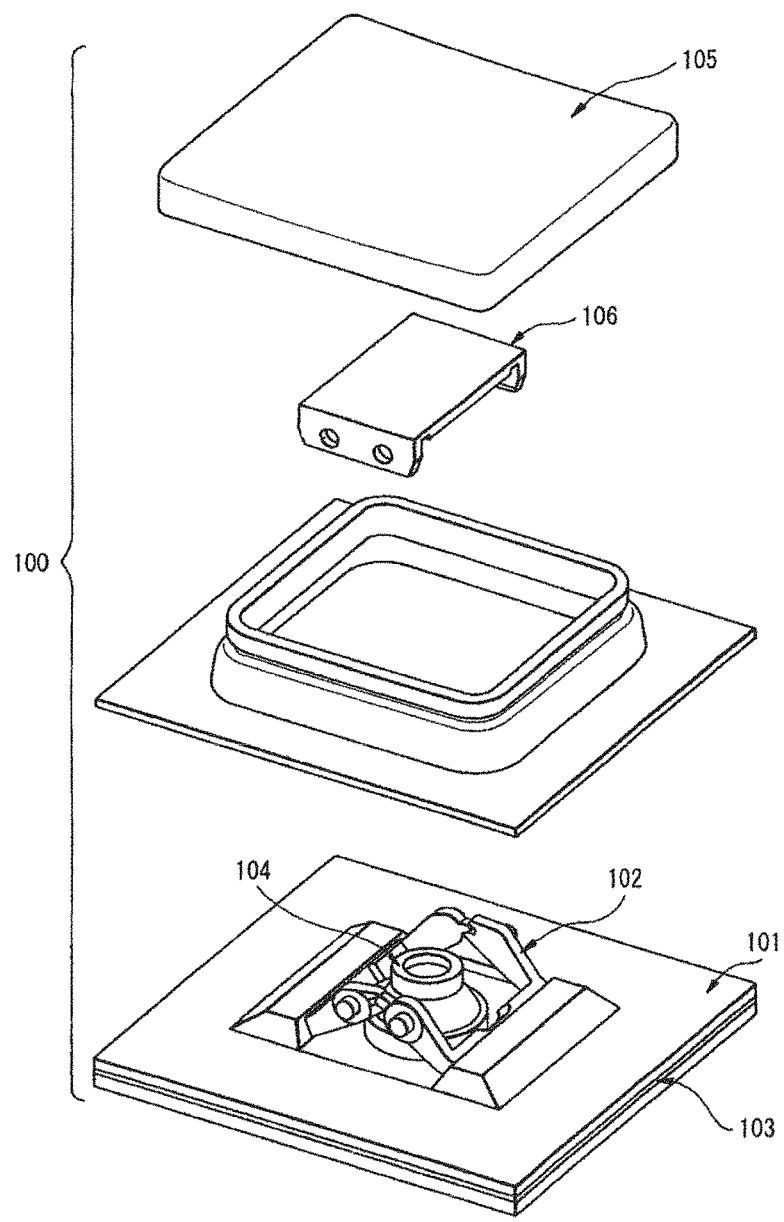
FIG. 7 is an exploded perspective view illustrating a configuration of a conventional key switch device when viewed from above.
Figure 8:
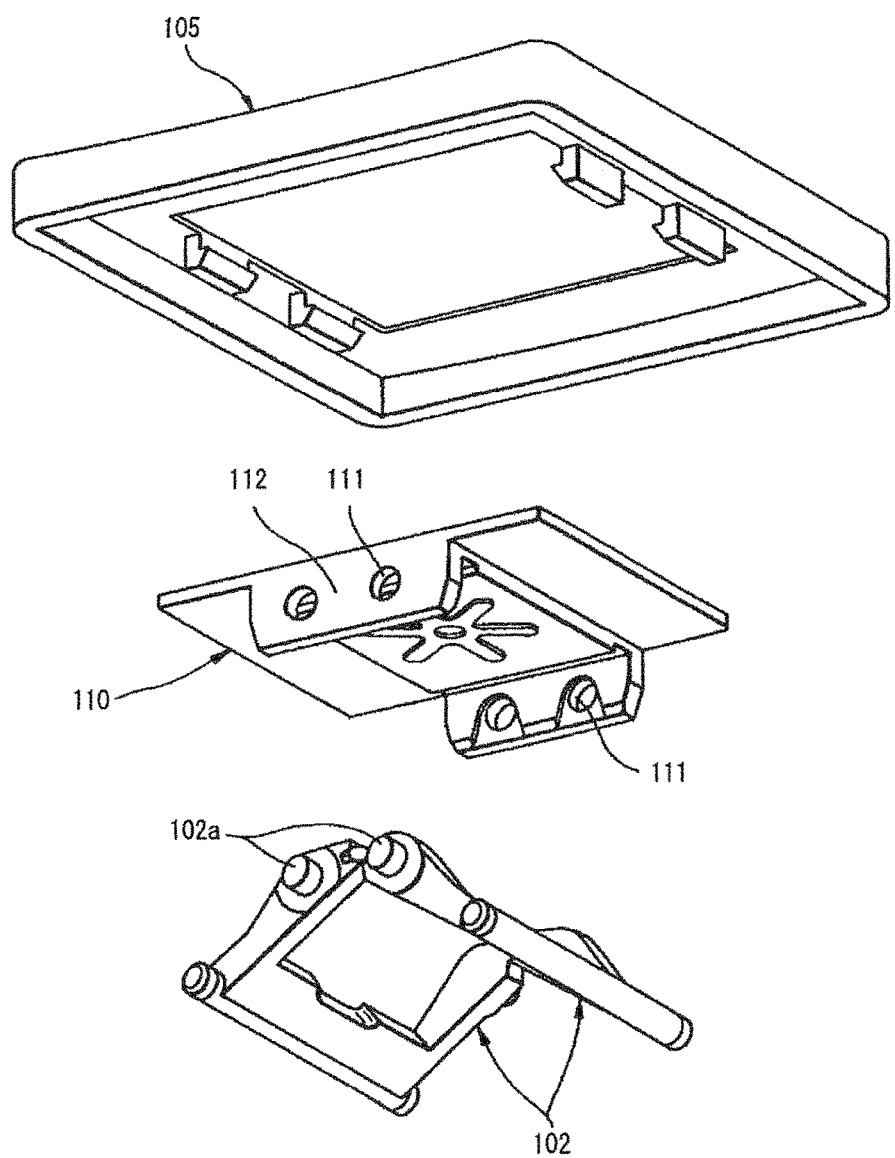
FIG. 8 is an exploded perspective view illustrating a configuration of the conventional key switch device when viewed from below.

As illustrated in FIGS. 1(a) to 3, portions of the first arm 21b and the second arm 22b, which face the operation unit 50, are formed in a staircase shape, for example. However, this is not necessarily restrictive, and for example as illustrated in FIG. 6, there can be provided a switch 3 in which the portions of the first arm 21b and the second arm 22b, which face the operation unit 50, are formed linearly from the coupling portion 23 to a first rotary spindle 21d and a second rotary spindle 22d, and the first arm 21b and the second arm 22b are formed in a substantially triangular shape in cross section. In addition, the shapes of the first arm 21b and the second arm 22b are not limited to this, and may be a plate shape or a bar shape.

Both ends of the first latching rod 21c and the second latching rod 22c are respectively formed with the first rotary spindles 21d and the second rotary spindles 22d as end-side supported portions. The first rotary spindle 21d and the second rotary spindle 22d are to be accepted by a first bearing 51 and a second bearing 52, described later, provided in the operation unit 50.

In the embodiment, the first rotary spindle 21d and the second rotary spindle 22d are to be accepted in the loosely fitted state by the first bearing 51 and the second bearing 52 as sliding regulators. As a result, in the embodiment, when the operation unit 50 moves in the vertical direction with respect to the base 10, the first rotary spindle 21d and the second rotary spindle 22d are slidable in a direction substantially perpendicular to the vertical direction and in a direction substantially perpendicular to turning shafts of the pair of link members 20 while being regulated within the ranges of the first bearing 51 and the second bearing 52.

The respective centers of the first latching rod 21c and the second latching rod 22c are formed with an upper end flat surface portion 21e and an upper end flat surface portion 22e having flat upper surfaces so that the postures at the upper end positions of the operation unit 50 are held in parallel to the base 10.

Sections of the first arm 21b and the second arm 22b which are near the coupling portion 23 are formed with a first curved portion 21f and a second curved portion 22f as coupling-portion-side supported portions protruding downward in a curved shape. As a result, the first curved portion 21f and the second curved portion 22f are disposed as shifted to the base 10 side from straight lines connecting between the coupling portion 23 and the first rotary spindle 21d/the second rotary spindle 22d.

In the embodiment, upon turning of the first link member 21 and the second link member 22, the first curved portion 21f and the second curved portion 22f slide on the upper surface of the guard portion 13 of the base 10, and the first curved projection 21g and the second curved projection 22g slide on the lower surface of the overhanging portion 15a in the side wall recessed groove portion 15 of the base 10. As a result, when the operation unit 50 is depressed to a lower limit position and the first link member 21 and the second link member 22 come into the open state, the coupling portion 23 is lifted to a slightly higher position than the first curved portion 21f and the second curved portion 22f. This can reduce variation in interval between the first rotary spindle 21d of the first link member 21 and the second rotary spindle 22d of the second link member 22 when the operation unit 50 moves in the vertical direction with respect to the base 10.

Further, near the coupling portion 23 inside the first arm 21b and the second arm 22b of the embodiment, as illustrated in FIG. 3, the first curved projection 21g and the second curved projection 22g are formed, having a curved shape and protruding such that the upper surfaces thereof come into contact with the overhanging portion 15a of the side wall recessed groove portion 15. The first curved projection 21g and the second curved projection 22g are formed such that, when the first link member 21 and the second link member 22 are opened with the coupling portion 23 at the center, the upper surfaces of the first curved projection 21g and the second curved projection 22g come into contact with the overhanging portion 15a of the side wall recessed groove portion 15 and slide. As a result, the first curved projection 21g and the second curved projection 22g are disposed as shifted downward from the straight lines connecting between the coupling portion 23 and the first rotary spindle 21d/the second rotary spindle 22d.

Next, the switch mechanism 30 is made up of two L-shaped conductive plates 31, 32 formed of a flexible metal provided so as to come into contact with each other when the operation unit 50 is depressed. On the L-shaped conductive plates 31, 32, lead terminals 31a, 32a for connecting to a substrate (not illustrated) are provided extending downward. On the respective side surfaces of the conductive plates 31, 32, contact terminals 31b, 32b are provided facing each other. The ends of the L-shaped conductive plates 31, 32 are formed with cam slid portions 31c, 32c which are each slid by a sliding cam 55 illustrated in FIG. 1(b), described later, which is provided on the rear surface of the operation unit 50. When the operation unit 50 is not depressed, the sliding cam 55 of the operation unit 50 comes into contact with the cam slid portions 31c, 32c of the L-shaped conductive plates 31, 32 to press the cam slid portions 31c, 32c and bend the L-shaped conductive plates 31, 32, so that the contact terminals 31b, 32b of the L-shaped conductive plates 31, 32 are not in contact with each other. On the other hand, when the operation unit 50 is depressed, the sliding cam 55 of the operation unit 50 does not come into contact with each of the cam slid portions 31c, 32c of the L-shaped conductive plates 31, 32, so that the contact terminals 31b, 32b of the L-shaped conductive plates 31, 32 come into contact with each other. As a result, at the time of depressing the operation unit 50, the L-shaped conductive plate 31 and the L-shaped conductive plate 32 become conductive and the switch is turned on.

Note that the switch mechanism 30 of the embodiment is not limited to what has been described above, but may be any configuration having a function as a switch, such as a membrane switch or a contactless switch.

Next, the coil spring 40 applies an urging force to the depression of the operation unit 50 and restores the operation unit 50 into the original state prior to the depression. Note that the coil spring 40 may be another elastic member.

Next, the operation unit 50 is a dish-shaped member having a substantially rectangular planar shape and is provided with a pair of the first bearings 51 and a pair of the second bearings 52 that are rotatably latched to the first rotary spindle 21d and the second rotary spindle 22d of the first link member 21 and the second link member 22. As a result, the operation unit 50 is supported by the first link member 21 and the second link member 22 in a freely depressed manner.

In the switch 1 of the embodiment, the following case has been described. The pair of link members 20 includes the first curved portion 21f and the second curved portion 22f as the coupling-portion-side supported portions supported by the base 10, and the first rotary spindle 21d and the second rotary spindle 22d as the end-side supported portion supported by the operation unit 50. When the operation unit 50 moves in the vertical direction with respect to the base 10, the first curved portion 21f, the second curved portion 22f, the first curved projection 21g, and the second curved projection 22g slide in the direction substantially perpendicular to the vertical direction with respect to the base 10.

However, the present invention is not necessarily limited thereto, and the following configuration may be formed. The pair of link members 20 includes the coupling-portion-side supported portion supported by the operation unit 50 and the end-side supported portion supported by the base. When the operation unit 50 moves in the vertical direction with respect to the base 10, the coupling-portion-side supported portion slides in the direction substantially perpendicular to the vertical direction with respect to the operation unit.

(Operation of Switch)

Figure 4A:
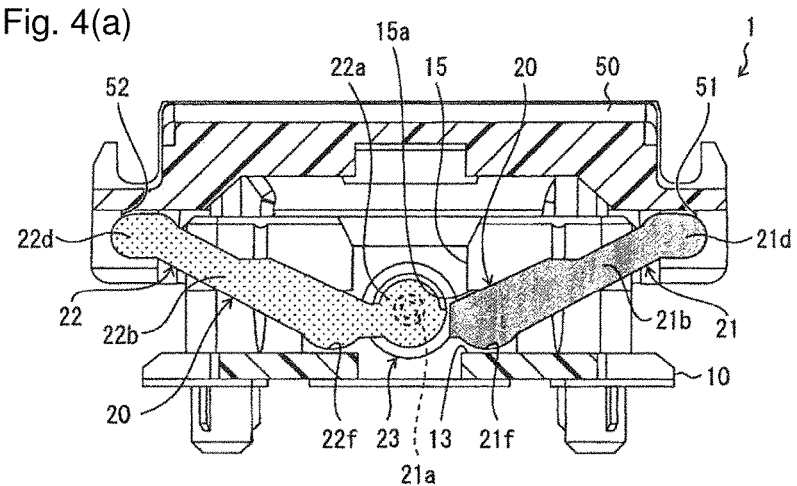
FIG. 4(a) is a sectional view illustrating a state of the switch when the operation unit is not depressed.
Figure 4B:
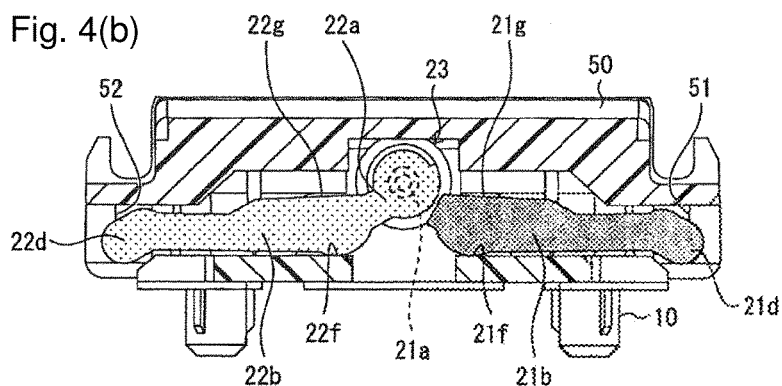
FIG. 4(b) is a sectional view illustrating a state of the switch when the operation unit is depressed.

The operation of the switch 1 having the above configuration when the operation unit 50 is not depressed and when the operation unit 50 is depressed will be described with reference to FIGS. 4(a), 4(b) and FIGS. 2(a), 2(b). FIG. 4(a) is a sectional view illustrating a state of the switch 1 when the operation unit 50 is not depressed, namely, a state in which the operation unit 50 is present at the upper limit position. FIG. 4(b) is a sectional view illustrating a state of the switch 1 when the operation unit 50 is depressed, namely, a state in which the operation unit 50 is present at the lower limit position.

As illustrated in FIGS. 4(a) and 2(a), when the operation unit 50 of the switch 1 is not depressed, namely, before depressed, the operation unit 50 is present at the upper limit position. At this time, the first link member 21 and the second link member 22 are supported by the coupling portion 23 pivotally supporting one ends of the first arm 21b and the second arm 22b in a turnable manner and by the first bearing 51 and the second bearing 52 of the operation unit 50 accepting the other ends of the first rotary spindle 21d and the second rotary spindle 22d.

When a user depresses the operation unit 50 with a finger or the like from the above state, the first bearing 51 and the second bearing 52 of the operation unit 50 are depressed so that the first link member 21 and the second link member 22 are turned around the coupling portion 23 while sliding in contact portions between the first curved portion 21f/the second curved portion 22f and the guard portion 13 of the base 10 and in contact portions between the first curved projection 21g/the second curved projection 22g and the overhanging portion 15a of the side wall recessed groove portion 15. At this time, the first rotary spindle 21d and the second rotary spindle 22d in the first arm 21b and the second arm 22b of the first link member 21 and the second link member 22 move in the perpendicular direction while making small movement outward. As a result, the first link member 21 and the second link member 22 lift the coupling portion 23 when sliding in the contact portions between the first curved portion 21f/the second curved portion 22f and the guard portion 13 of the base 10 and in the contact portions between the first curved projection 21g/the second curved projection 22g and the overhanging portion 15a of the side wall recessed groove portion 15.

Therefore, as illustrated in FIG. 4(b) and FIG. 2(b), even when the operation unit 50 moves to the lower limit position, the operation unit 50 can move while the lengths of the first arm 21b and the second arm 22b cause no problem. By the downward movement of the operation unit 50, the L-shaped conductive plate 31 of the switch mechanism 30 is bent by the sliding cam (not illustrated) formed on the rear surface of the operation unit 50, and the contact terminal 31b of the L-shaped conductive plate 31 comes into contact with the contact terminal 32b of the L-shaped conductive plate 32. As a result, the L-shaped conductive plate 31 and the L-shaped conductive plate 32 become conductive, and the switch is turned on.

When the user releases the press of the finger to the operation unit 50 from the state of depressing the operation unit 50, the operation unit 50 is restored to the original upper limit position by the urging force of the coil spring 40.

As a result, in the switch 1 of the embodiment, in the depressing operation of the operation unit 50, only the first rotary spindle 21d and the second rotary spindle 22d are latched to the first bearing 51 and the second bearing 52, so that the clearance is constant, and there is little risk of biting of a foreign matter.

In addition, by the depression of the operation unit 50, the sliding position moves mainly in the first curved portion 21f and the second curved portion 22f of the first link member 21 and the second link member 22 and the guard portion 13, so that the outer edges of the first link member 21 and the second link member 22 hardly spread outward.

(Improvement of Pull-Out Strength of Operation Unit)

Figure 1A:
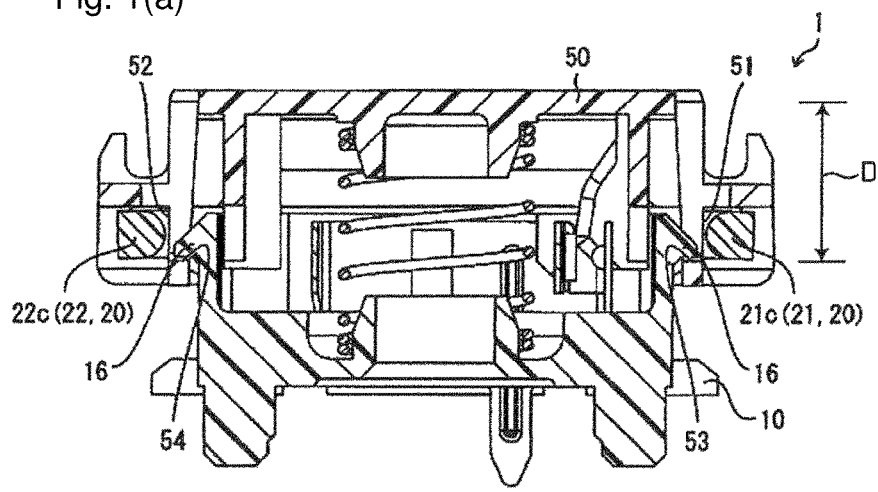
FIG. 1(a) is a sectional view illustrating a configuration of a switch in an embodiment of the present invention.
Figure 1B:
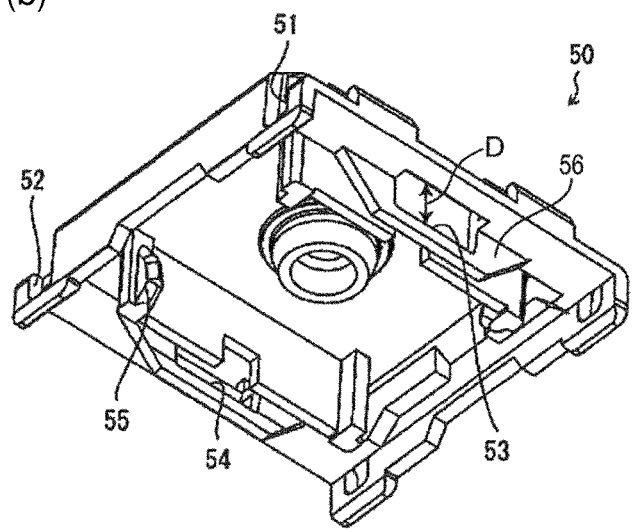
FIG. 1(b) is a perspective view illustrating a state in which an operation unit in the switch is viewed from below.

Improvement in pull-out strength of the operation unit 50 in the switch 1 of the embodiment will be described with reference to FIGS. 1(a) and 1(b) and FIG. 3 described above. FIG. 1(a) is a sectional view illustrating the configuration of the switch 1 of the embodiment. FIG. 1(b) is a perspective view illustrating a state in which the configuration of the operation unit 50 of the switch 1 is viewed from below.

In the switch 1 of the embodiment, as illustrated in FIGS. 2(a) and 2(b) described above, the first link member 21 and the second link member 22 couple between the base 10 and the operation unit 50. The coupling portion 23 pivotally supports and couples between the first link member 21 and the second link member 22 in a turnable manner. With this configuration, it is possible to achieve a structure capable of maintaining a state in which the operation unit 50 faces a certain direction when the operation unit 50 moves in the vertical direction with respect to the base 10.

In the case of the configuration in which the operation unit 50 and the base 10 are connected only by the pair of link members 20, for example, when a force pulling upward is externally applied to the operation unit 50, the operation unit 50 needs to withstand such a force by relying only on the strength of the connection structure formed by the link member 20.

However, for example, in the case of downsizing the switch 1, there is decrease in resistance to the upward external force as described above due to a limit to the structural strength of the link member 20.

Therefore, in the switch 1 of the embodiment, as illustrated in FIGS. 1(a) and 3, the claw portion 16 as the base-side latching portion is provided at the center of the upper portion of the other opposed side wall 12b of the square frame 12 in the base 10, and as illustrated in FIGS. 1(a) and 1(b), claw latching portions 53, 54 (an example of latching holes) as the operation-unit-side latching portion are provided on the rear surface of the operation unit 50. That is, the operation unit 50 includes a second side wall portion which extends along the contacting/separating direction toward the base 10 and is provided with the latching portions 53, 54, and on which the claw latching portions 53, 54 are disposed to be able to be latched to the claw portions 16.

In the embodiment, at least one of the claw portions 16 and the claw latching portions 53, 54 is configured to be elastically deformable, and the claw portions 16 and the claw latching portions 53, 54 are latched to each other by a snap fit structure.

As a result, in the switch 1 of the embodiment, two each of the first bearings 51 and the second bearings 52 are formed at both ends of the operation unit 50. Not only the first bearing 51 and the second bearing 52 respectively accept the first rotary spindle 21*d* and the second rotary spindle 22*d* of the first link member 21 and the second link member 22, but also the claw portions 16 are formed in the base 10 and the claw latching portions 53, 54 of the operation unit 50 are fitted to the claw portions 16 in a snap fashion. Hence the operation unit 50 is fitted to the base 10 as well as to the link member 20. It is thus possible to improve the pull-out strength of the operation unit 50 in the switch 1.

The embodiment is configured as follows. The upper limit position (the position of the separating-direction end) is determined by the connection with the link member 20, and with the operation unit 50 at the upper limit position, when an upward external force acts on the operation unit 50, the support by the snap fit structure prevents the operation unit 50 from coming off. That is, with the operation unit 50 at the upper limit position, the lower ends of the claw portions 16 and the upper ends of the claw latching portions 53, 54 are not necessarily in contact with each other, but may be separated.

Conversely, for example, the embodiment can also be configured as follows. The upper limit position of the operation unit 50 is determined by the latching between the lower ends of the claw portions 16 and the claw latching portions 53, 54, and with the operation unit 50 at the upper limit position, when an upward external force acts on the operation unit 50, the support by the operation unit 50 and the link member 20 prevents the operation unit 50 from coming off.

Further, in the embodiment, in a state where the operation unit 50 is disposed at the separating-direction end of the allowable movement range, namely, the upper limit position, as illustrated in FIG. 1(*a*), the first latching rod 21*c* and the second latching rod 22*c* as the end-side supported portions of the pair of link members 20 laterally come into contact with the claw portions 16 and the claw latching portions 53, 54 and press the claw portions 16 and the claw latching portions 53, 54 on the inside. Therefore, at the time of assembly, the first latching rod 21*c* and the second latching rod 22*c* as the end-side supported portions of the pair of link members 20 are present below the claw portions 16 and the claw latching portions 53, 54, and in this state, the claw portions 16 and the claw latching portions 53, 54 are latched to each other. Thereafter, with the operation unit 50 at the upper limit position, when the first rotary spindle 21*d* and the second rotary spindle 22*d* of the link member 20 are received by the first bearing 51 and the second bearing 52 of the operation unit 50, the first latching rod 21*c* and the second latching rod 22*c* of the link member 20 come into the state of elastically pressing the claw portions 16 and the claw latching portions 53, 54 inward. That is, as illustrated in FIGS. 1(*a*) and 1(*b*), the space of each of the claw latching portions 53, 54 as latching holes in the contacting/separating direction of the operation unit 50 is a movable range D of the claw portion 16 in the contacting/separating direction, and the movable range D of the claw portion 16 in the contacting/separating direction is an allowable movement range in the contacting/separating direction of the operation unit 50.

As described above, the first latching rod 21*c* and the second latching rod 22*c* of the link members 20 of the embodiment are disposed at such positions as to prevent elastic deformation of at least one of the claw portions 16 and the claw latching portions 53, 54. That is, a part of the link member is disposed so as to face the claw portion 16 and regulates the movement of the claw portion 16 in the protruding direction (the horizontal direction in FIG. 1(*a*))

As a result, the claw portions 16 and the claw latching portions 53, 54 are prevented from being elastically deformed, and the snap fit is prevented from being released.

A variety of embodiments of the present invention have been described in detail with reference to the drawings, and lastly, a variety of aspects of the present invention will be described.

A switch of a first aspect of the present invention includes: a base; an operation unit disposed on the base and moving in a vertical direction in response to an external force; and a link member configured to guide movement of the operation unit in the vertical direction and supported by the base and the operation unit. A base-side latching portion provided in the base and an operation-unit-side latching portion provided in the operation unit are latched to each other to inhibit the operation unit from moving beyond the upper end of an allowable movement range.

In other words, the switch of the first aspect of the present invention includes: a base; an operation unit disposed on the base and moving in a contacting/separating direction with respect to the base in response to an external force; and a link member configured to guide movement of the operation unit in the contacting/separating direction and support the operation unit on the base. The base includes a base-side latching portion, the operation unit includes an operation-unit-side latching portion configured to be latched to base-side latching portion at an end of an allowable movement range for the operation unit in a separating direction in which the operation unit is separated from the base, and the base-side latching portion and the operation-unit-side latching portion are latched to each other, to inhibit the operation unit from moving in the separating direction beyond the separating-direction end of the allowable movement range.

According to the switch of the first aspect, the base and the operation unit are connected by the link member, so that the operation unit is movable in the contacting/separating direction with respect to the base. In the case of the configuration in which the operation unit and the base are supported only by the link member, for example, when a force pulling in the separating direction is externally applied to the operation unit, the operation unit needs to withstand such a force by relying only on the strength of the connection structure formed by the link member.

However, for example, in the case of downsizing the switch, there is decrease in resistance to the upward external force as described above due to a limit to the structural strength of the link member.

Therefore, in the switch of the first aspect, the base-side latching portion provided in the base and the operation-unit-side latching portion provided in the operation unit are latched to each other to inhibit the operation unit from moving beyond the separating-direction end of the allowable movement range. That is, the base-side latching portion is formed in the base and the operation-unit-side latching portion is formed in the operation unit, and the base-side latching portion and the operation-unit-side latching portion are latched to each other, so that the operation unit is latched not only to the link member but also to the base.

It is thus possible to improve the resistance of the operation unit to the external force in the separating direction and to provide the switch with higher reliability.

In a switch of a second aspect of the present invention, in the switch of the above aspect, at least one of the base-side latching portion and the operation-unit-side latching portion is formed of an elastic member, and the base-side latching portion and the operation-unit-side latching portion are latched to each other by a snap fit structure.

In other words, in the switch according to the second aspect of the present invention, at least one of the base-side latching portion and the operation-unit-side latching portion is formed of a latching projection, at least the other of the base-side latching portion and the operation-unit-side latching portion is formed of a latching hole to which the latching projection is able to be latched, and the base-side latching portion and the operation-unit-side latching portion are latched to each other by a snap fit structure.

According to the switch of the second aspect, since the base-side latching portion and the operation-unit-side latching portion are latched to each other by the snap fit structure, it is possible to facilitate assembly of the base and the operation unit.

In a switch of a third aspect of the present invention, in the switch of the above aspect, in a state where the operation unit is disposed at the upper end of the allowable movement range, a part of the link member is disposed at such a position as to prevent elastic deformation of at least one of the base-side latching portion and the operation-unit-side latching portion.

In other words, in the switch according to the third aspect of the present invention, in a state where the operation unit is disposed at the separating-direction end of the allowable movement range, a part of the link member is disposed to face the latching projection and regulates movement of the latching projection in a protruding direction.

According to the switch of the third aspect, in a state where the operation unit is disposed at the separating-direction end of the allowable movement range, the link member prevents elastic deformation in the snap fit structure. As a result, when a force pulling in the separating direction is externally applied to the operation unit, the elastic deformation occurs in the snap fit structure, to reduce the risk that the latching between the base-side latching portion and the operation-unit-side latching portion comes off.

In a switch of a fourth aspect of the present invention, in the switch described above, it is preferable that the link member include a first link member and a second link member, the link member include a coupling portion configured to pivotally support and couple between the first link member and the second link member in a turnable manner, the first link member and the second link member each include a coupling-portion-side supported portion supported by one of the base and the operation unit, and an end-side supported portion supported by the other of the base and the operation unit, and the end-side supported portion is disposed at such a position as to prevent elastic deformation of at least one of the base-side latching portion and the operation-unit-side latching portion.

In other words, in the switch according to the fourth aspect of the present invention, the link member includes a first link member and a second link member, the link member includes a coupling portion configured to turnably couple between the first link member and the second link member, the first link member and the second link member each include a coupling-portion-side supported portion supported by one of the base and the operation unit, and an end-side supported portion supported by the other of the base and the operation unit, and the end-side supported portion is disposed to face the latching projection and regulates the movement of the latching projection in a protruding direction.

According to the switch of the fourth aspect, the end-side supported portions in the first link member and the second link member prevent elastic deformation in the snap fit structure. As a result, it is possible to achieve prevention of elastic deformation in the snap fit structure by utilizing the movement of the end-side supported portion due to the upward movement of the operation unit.

In a switch of a fifth aspect of the present invention, the base includes a first side wall portion which is disposed near an outer edge of the base, extends along the contacting/separating direction toward the operation unit, and is provided with the base-side latching portion, and the operation unit includes a second side wall portion which extends along the contacting/separating direction toward the base and is provided with the operation-unit-side latching portion, and on which the operation-unit-side latching portion is disposed to be able to be latched to the base-side latching portion.

According to the switch of the fifth aspect, it is possible to reliably latch the operation unit to the base. This enables improvement in resistance of the operation unit to the external force in the separating direction is improved, and the reliability of the switch can be enhanced.

A keyboard of a sixth aspect of the present invention includes a plurality of the switches of the above aspect.

According to the keyboard of the sixth aspect, it is possible to improve resistance of the operation unit to an external force and provide a keyboard including a switch with higher reliability.

By appropriately combining freely selected embodiments or modified examples of the above variety of embodiments or modified examples, the respective effects of those combined can be exerted. While it is possible to combine embodiments, combine examples, or combine an embodiment and an example, it is also possible to combine features in different embodiments or examples.

Figure 9:
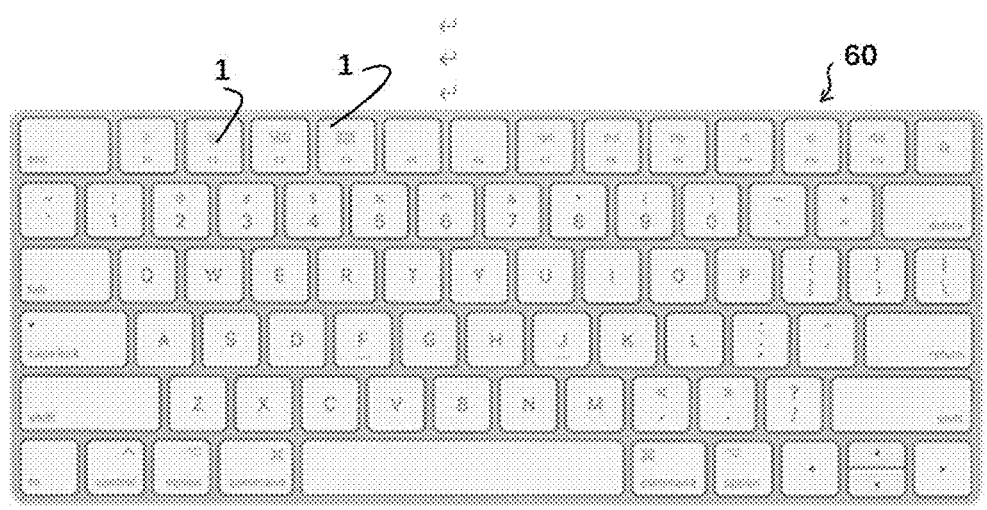
FIG. 9 is a view illustrating a keyboard comprising a plurality of switches according to an embodiment of present invention.

The switch of the present invention is applicable to, for example, a keyboard for a personal computer. FIG. 9 is a view illustrating a keyboard 60 comprising a plurality of switches 1 according to an embodiment of present invention.

The keyboard of the present invention is usable as, for example, a keyboard for a personal computer.

DESCRIPTION OF SYMBOLS

1~3 switch
10 base
11 bottom
12 square frame
12*a* one opposed side wall
12*b* the other opposed side wall (example of first side wall)
13 guard portion
14 extrusion preventing wall (example of deformation preventing portion)
15 side wall recessed groove portion (example of gap)
15*a* overhanging portion (example of wall surface)
16 claw portion (example of base-side latching portion (latching projection))
20 link member
21 first link member
21*a* shaft portion (example of coupling portion)
21*b* first arm (example of connection member)
21*c* first engagement rod (example of end-side supported portion)
21*d* first rotary spindle (example of end-side supported portion)
21*e* upper end flat portion 21f first curved portion (example of coupling-portion-side supported portion)
21g first curved projection
22 second link member
22a shaft hole portion (example of coupling portion)
22b second arm (example of connection member)
22c second engagement rod (example of end-side supported portion)
22d second rotary spindle (example of end-side supported portion)
22e upper end flat portion
22f second curved portion (example of coupling-portion-side supported portion)
22g second curved projection
23 coupling portion
30 switch mechanism
31, 32 L-shaped conductive plate
31a, 32a lead terminal
31b, 32b contact terminal
31c, 32c cam slid portion
40 coil spring
50 operation unit
51 first bearing (example of sliding regulator)
52 second bearing (example of sliding regulator)
53, 54 claw latching portion (example of operation-unit-side latching portion (latching hole))
55 sliding cam
56 second side wall portion
D allowable movement range

The invention claimed is:

1. A switch comprising:
a base;
an operation unit disposed on the base and moving in a contacting-separating direction with respect to the base in response to an external force; and
a link member configured to guide movement of the operation unit in the contacting-separating direction and support the operation unit on the base,
wherein the base includes a base-side latching portion,
wherein the operation unit includes an operation-unit-side latching portion configured to be latched to base-side latching portion at an end of an allowable movement range for the operation unit in a separating direction in which the operation unit is separated from the base, and
wherein the base-side latching portion and the operation-unit-side latching portion are latched to each other to inhibit the operation unit from moving in the separating direction beyond the separating-direction end of the allowable movement range,
wherein at least one of the base-side latching portion and the operation-unit-side latching portion is formed of a latching projection,
wherein at least the other of the base-side latching portion and the operation-unit-side latching portion is formed of a latching hole to which the latching projection is able to be latched, and
wherein the base-side latching portion and the operation-unit-side latching portion are latched to each other by a snap fit structure,
wherein in a state where the operation unit is disposed at the separating-direction end of the allowable movement range, a part of the link member is disposed to face the latching projection and regulates movement of the latching projection in a protruding direction.

2. The switch according to claim 1,
wherein the base includes a first side wall portion which is disposed near an outer edge of the base, extends along the contacting-separating direction toward the operation unit, and is provided with the base-side latching portion, and
wherein the operation unit includes a second side wall portion which extends along the contacting-separating direction toward the base and is provided with the operation-unit-side latching portion, and on which the operation-unit-side latching portion is disposed to be able to be latched to the base-side latching portion.

3. A keyboard comprising a plurality of the switches according to claim 1.

4. The switch according to claim 1,
wherein the link member includes a first link member and a second link member,
wherein the link member includes a coupling portion configured to turnably couple between the first link member and the second link member,
wherein the first link member and the second link member each include
wherein a coupling-portion-side supported portion supported by one of the base and the operation unit, and
wherein an end-side supported portion supported by the other of the base and the operation unit, and
wherein the end-side supported portion is disposed to face the latching projection and regulates the movement of the latching projection in a protruding direction.

5. The switch according to claim 4,
wherein the base includes a first side wall portion which is disposed near an outer edge of the base, extends along the contacting-separating direction toward the operation unit, and is provided with the base-side latching portion, and
wherein the operation unit includes a second side wall portion which extends along the contacting-separating direction toward the base and is provided with the operation-unit-side latching portion, and on which the operation-unit-side latching portion is disposed to be able to be latched to the base-side latching portion.

6. A switch comprising:
a base;
an operation unit disposed on the base and moving in a contacting-separating direction with respect to the base in response to an external force; and
a link member configured to guide movement of the operation unit in the contacting-separating direction and support the operation unit on the base,
wherein the base includes a base-side latching portion,
wherein the operation unit includes an operation-unit-side latching portion configured to be latched to base-side latching portion at an end of an allowable movement range for the operation unit in a separating direction in which the operation unit is separated from the base,
wherein the base-side latching portion and the operation-unit-side latching portion are latched to each other to inhibit the operation unit from moving in the separating direction beyond the separating-direction end of the allowable movement range,
wherein at least one of the base-side latching portion and the operation-unit-side latching portion is formed of a latching projection which protrudes in a protruding direction perpendicular to the separating direction,
wherein at least the other of the base-side latching portion and the operation-unit-side latching portion is formed of a latching hole to which the latching projection is able to be latched, wherein the base-side latching portion and the operation-unit-side latching portion are latched to each other by a snap fit structure, and wherein in a state where the operation unit is disposed at the separating-direction end of the allowable movement range, a part of the link member is disposed to face the latching projection, so that the part of the link member regulates movement of at least one of the base-side latching portion and the operation-unit-side latching portion in the protruding direction perpendicular to the separating direction.

7. The switch according to claim 6, wherein the link member includes a first link member and a second link member, wherein the link member includes a coupling portion configured to turnably couple between the first link member and the second link member, wherein the first link member and the second link member each include:

a coupling-portion-side supported portion supported by one of the base and the operation unit, and an end-side supported portion supported by the other of the base and the operation unit, and wherein the end-side supported portion is disposed to face the latching projection, so that the end-side supported portion regulates the movement of at least one of the base-side latching portion and the operation-unit-side latching portion in the protruding direction perpendicular to the separating direction.

\* \* \* \* \*